United States Patent Office 3,799,868
Patented Mar. 26, 1974

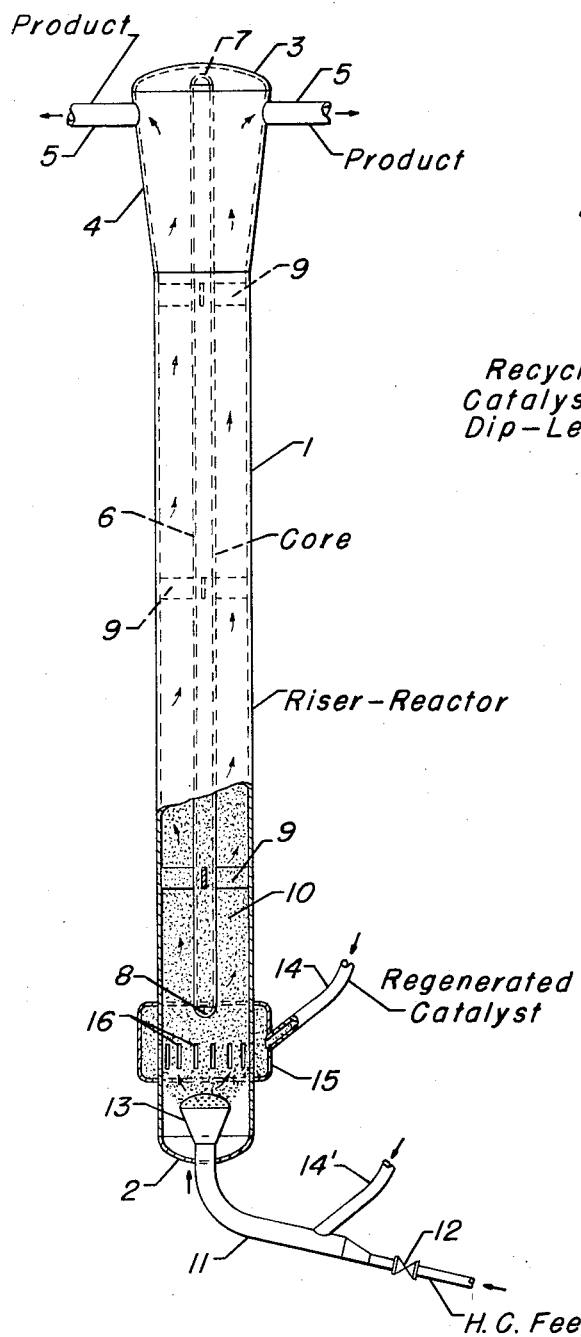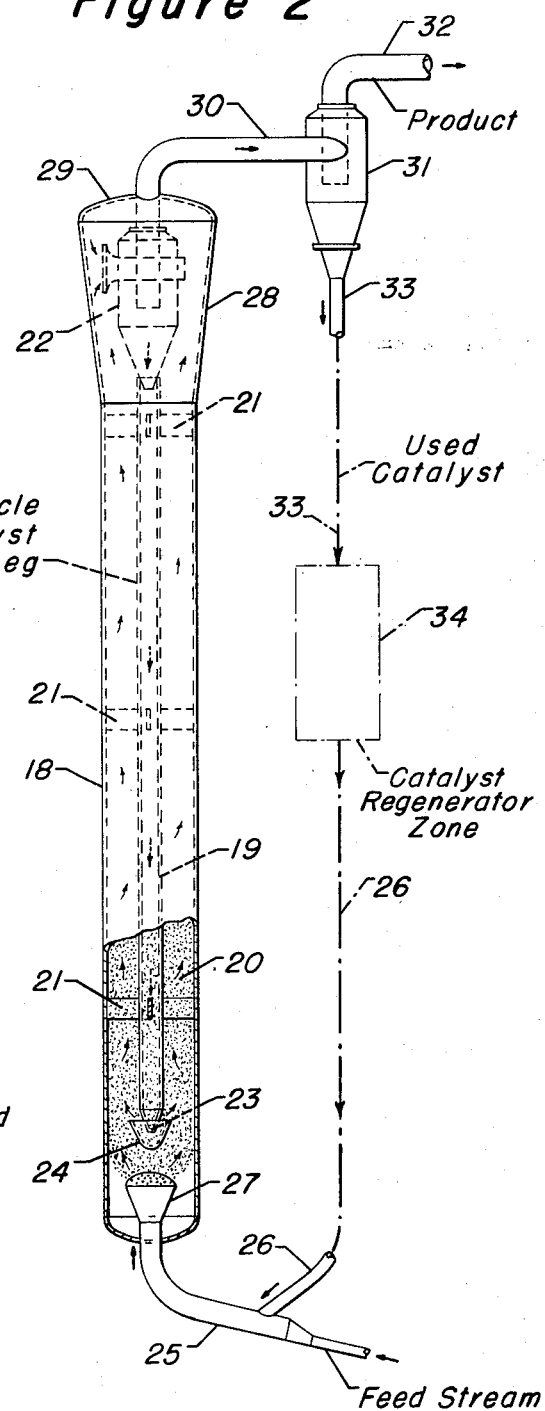

3,799,868
RISER-REACTOR SYSTEM PROVIDING IMPROVED
FLUIDIZED CATALYST CONTACTING
James E. Gantt, Elmwood Park, Ill., assignor to Universal
Oil Products Company, Des Plaines, Ill.
Filed Oct. 28, 1971, Ser. No. 193,510
Int. Cl. B01j 9/00; C10g 13/14
U.S. Cl. 208—153                                5 Claims

ABSTRACT OF THE DISCLOSURE

A dilute phase riser-reactor system with an axial core member therethrough provides an elongated upwardly flowing annular-shaped column of catalyst reactant mixture. The elimination of a central portion of a large riser-reactor also eliminates the usual zone of low concentration of particles and thus enhances the fluidized contacting operation. A modified construction and arrangement utilizing a central core member as a dip-leg for the recirculation of catalyst has the advantage of providing for a high catalyst to oil ratio in the riser-reaction zone and a lowered quantity of catalyst to be handled by a regenerator.

---

The present invention is directed to providing improved catalyst contacting in the riser-reactor of a fluidized catalyst unit by having an axial core member which will occupy the central zone of the rising dilute-phase column of reactant stream and entrained particles.

More particularly, the present invention is directed to a riser-reactor system which provides a central core member for the substantial full length of the riser-reactor, so as to eliminate a central gas or vapor "by-pass" zone where normally there is a low catalyst density and a resulting poor catalyst contacting operation. The problem is particularly bad for large diameter rise-reactors.

The fluidized contacting of a reactant stream may be carried out by various methods and by varying types of contacting apparatus. For certain conversions, it is of advantage to use a dense-phase, "hindered settling" type of contact, with catalyst and reactant streams flowing countercurrently or, at least in part, countercurrently, with respect to one another. On the other hand, it is of advantage for certain conversions to utilize a co-current flow where there is a relatively low density of particles and an operation generally referred to as "dilute phase" contacting. For example, the present day use of high activity catalysts has led to the desirability of passing a fresh feed stream, such as a gas oil stream, to a catalytic cracking unit which has a riser-reactor type of system and where there is provided a rapid, "once-through" contacting of the catalyst with the charge stream.

Also, in connection with the production of an olefin from a saturated stream, such as propylene from the catalytic dehydrogenation of propane, it has been considered particularly desirable to have a continuous fluidized operation, where the propane feed stream will contact high temperature regenerated catalyst particles in a turbulent concurrent flow, as provided by what is referred to in the petroleum industry as a "riser-reactor" type flow, or "dilute phase" flow. Typically, the concentration or density of the catalyst within the riser-reaction zone will be from 2 to 15 lbs./cu. ft. for a finely divided "fluid" type catalyst having an apparent bulk density of the order of 0.6 to 1.0 grams per cc. of catalyst.

It is thus an object of the present invention to provide a riser-reactor unit with a central core member so as to result in better feed stream-catalyst contacting in the unit and resulting higher conversion efficiency.

In addition to the need to provide means to minimize back-mixing and to overcome by-passing of catalyst in a large diameter riser, there is the need to provide a controlled arrangement for recirculating catalyst within the reaction zone. Actually, the once-through contacting of a propane stream by a typical dehydrogenation catalyst in a riser-reactor operation does not result in a particularly carbonized catalyst, or in a deactivated catalyst, so that at least a portion of the catalyst can well be recirculated to the inlet end of the reactor.

Thus, it is an additional object of the present invention to provide a riser-reactor system which has a central core member serving to provide an annular-form reaction zone and also serving, in combination with particle separating means, to provide an elongated "dip-leg" that will effect a controlled recirculation of catalyst to the inlet end portion of the riser-reaction zone.

Broadly, the present invention provides a riser-reactor for the dilute phase catalytic conversion of a gaseous reactant stream, which comprises in combination, a substantially vertically disposed, tubular-form housing, a core member extending axially therethrough for the major length of said housing to thereby define an annular-form contacting section in said housing, a particle inlet and a feed stream inlet means to the lower end portion of said housing whereby a dilute phase gas-particle stream can rise in said annular-form section, and a contacted stream outlet means from the upper end portion of said housing.

Generally, the core member will be of hollow tubular form and of sufficient diameter to effect the blockage of the normal inactive flow area along the axis of the riser-reactor. For example, the diameter of a tubular core member may be of the order of ⅓ to ½ of the outside diameter of the reactor chamber or housing which encompasses the resulting annular-form reaction zone. Also, generally, the core member will be hollow so as to be of light weight and minimize supporting problems throughout the length of the elongated reaction zone. In order to preclude gas flow into or out of the central core member, the latter will normally have the ends blocked and thus result in being a purely space occupying means to enhance the turbulent fluidized flow in a resulting annular-form rising column of particles and reactant stream. However, where deemed desirable, the central core member may be used to advantage to effect the recycle of a portion of the catalyst particles within the reaction zone and, in turn, provide for a relatively high catalyst to oil ratio in the reactor without having a high quantity of catalyst being recirculated through the regeneration zone.

In a simplified arrangement, the core member may be open at the top as well as the bottom and a suitable flow stream deflector member provided around the lower open end of the core member such that catalyst may enter the upper end of the central member near the product outlet zone and then fall by gravity through the central core member to be discharged by its hydrostatic head through a lower open end and then subsequently educted into the path of the normally rising column of reactivated catalyst and reactant stream. In a different embodiment, with means for controlling actual recirculation rate, there may be a centrifugal separator means at the top of the riser-reactor and the central core member used as an elongated "dip-leg" such that the portion of catalyst, or other particles, collected by the internal separator will fall by gravity through the core member to its lower end and thence pass into the rising annular column of introduced particles and feed stream. A suitable baffle or cup means may be provided at a spaced level from the lower end of the dip-leg in order to preclude the introduction of any of the charge stream into the lower end of the core member and at the same time there can be suitable shaping of such baffling or "cup" member to enhance the eduction of particles into the main rising column of particles and feed stream.

The separation being effected at the top of the riser-reactor column can be controlled so as to recycle a desired portion of the catalyst, as for example, 25%, 40%, etc., and the balance would go overhead with the product stream to additional separation means whereby the remaining entrained particles would be collected and transferred to a catalyst regeneration zone for removal of carbonaceous particles, catalytic reactivation and reheating.

It is not intended to limit the present improved riser-reactor system to utilization with any one type of process or catalytic conversion inasmuch as fluidized contacting and fluidized catalytic conversions are widely known in the processing arts. The improved system may well be used for catalytic cracking, dehydrogenation, desulfurization, etc. As a result, the catalyst may be suitable for cracking and comprise silica-alumina, with either high or low silica content, a molecular sieve type catalyst, etc., or, in connection with fluidized dehydrogenation, the catalyst may comprise finely divided alumina-chromia catalyst, or an alumina-chromia-potassia catalyst. The physical size of catalyst particles may vary but will typically be below about 150 microns in order to permit the dilute phase contacting to be effected throughout an elongated riser-reactor zone.

Still further, it is not intended to limit the use of the present improved riser-reactor system to be combined with any one type of reactivation zone or regenerator, or to any one type of introduction of reactivated particles back into the lower end of the reaction zone. The regenerated catalyst particles may be introduced into admixture with the gaseous or vaporous reactor stream below the end of the riser-reactor or optionally, the introduction of catalyst may be by way of distributor means into the particles directly above the inlet of the reactor stream such that the mixing takes place within the lower end of the reactor zone and the resulting dilute phase and the mixing of catalyst and feed stream takes place throughout the entire length and height of the riser-reactor column. Typically, the regenerated catalyst will be brought into the lower end of the reaction zone and into admixture with the feed stream at a temperature of the order of 150–250° F. greater than the average temperature maintained in the reaction zone so as to provide endothermic heat for such zone. The cracking temperature range may be of the order of 850° F. to 1000° F. while, with a process for dehydrogenating a light saturated hydrocarbon in a $C_3$–$C_6$ range, the temperature will be of the order of 950° to about 1300° F. and the preferred average range from about 1050° F. to about 1250° F.

The riser-reactor systems are also conventionally operated at relatively low superatmospheric pressures in ranges from atmospheric to about 50 lbs./sq. inch, with specific pressures being utilized which would effect the desired movement of the catalyst through the system in a controlled manner. The low pressure range, of course, minimizes construction problems and the thickness of metals for pressure vessels, piping, etc.

As hereinbefore pointed out, it may be of advantage in certain instances to have a relatively high catalyst to hydrocarbon ratio, typically referred to as the catalyst to oil ratio (or c/o), in order that there be a high quantity of catalyst present to provide heat carrying capacity throughout the height of the riser-reactor unit. Actually, the c/o ratio will vary in accordance with the type of processing operation and may vary from 4 to 40, by weight, but will typically be in the 15–30 range.

Reference to the accompanying drawing and the following description thereof will serve to illustrate the improved but simplified form of riser-reactor column which can serve to enhance a catalytic conversion process system in precluding the reactor stream by-passing through the normally low density axial zone. At the same time, additional advantageous features will be noted in connection with variations in construction and design which may be incorporated through the use of a central or axial core member extending throughout the full height of the riser-reactor zone.

FIG. 1 of the drawing is an elevational view, partially in section, indicating diagrammatically how the improved riser-reactor unit may be constructed and arranged to improve a method of carrying out a fluidized-disperse phase contacting system.

FIG. 2 of the drawing indicates diagrammatically in an elevational view, partially in section, a riser-reactor system wherein a central core member for the unit is utilized in combination with particle collection means to provide an elongated dip-leg and effect the controlled recycle of at least a portion of the catalyst in the system.

Referring now particularly to FIG. 1 of the drawing, there is indicated an elongated housing or conduit type member 1 which defines the exterior of an annular-form riser-reactor chamber. The lower end of the tubular housing 1 is provided with a closure member 2 and the upper end portion provided with a closure member 3. Actually, the upper end has a slightly enlarged conical section 4 in order to provide a product outlet section from which outlet conduits 5 are provided to carry product streams to suitable separator means, not shown as part of this embodiment. Also, it is deemed that catalyst regeneration means need not be shown in connection with describing the present embodiment invention.

Axially within the center of housing or tube member 1, there is provided a central core member 6 which is indicated as having closed end portions 7 and 8 and supported by spaced radial members 9 at different heights throughout the length of the column 1. As hereinbefore noted, the core member 6 may be of a solid type of construction; however, it will generally be hollow in order to provide a light weight member that can more readily be supported from the interior wall of housing 1. The core member will, of course, serve to block out the central zone or central area of the riser-reactor column and cause the disperse phase of fluidized catalyst and gaseous feed stream to move in a rising annular-form column, as indicated at 10. The feed to the column is indicated as being introduced by way of line 11, having control valve 12, and then carrying to a gas distributor means 13 such that there is a substantially uniform evolution of the vaporous or gaseous feed into the lower end of the riser-reactor zone 10. Catalyst from the regenerator means may be introduced directly into the transfer conduit 11 by way of a conduit means, such as shown by the dash lines at 14' or, alternatively, regenerated catalyst may be brought into the riser unit by way of a line 14 which in turn connects with a circumferential distributing header 15 that will introduce catalyst by way of openings 16 into the lower end of the chamber 1, directly above the feed distributor means 13. The result is the intermixing of the gaseous feed stream into light weight catalyst particles so that there is a disperse phase rising as a continuously moving annular-form column of particles throughout the entire height of the housing 1 to be discharged by way of outlet means 5. Inasmuch as the typical riser-reactor column operation is for a once-through type of contact, there are no particle separating means provided in the reaction zone to cause catalyst to fall backwardly into the riser-dispersed phase column. In other words, normally all of the catalyst carries ovehead with the product stream to outside separator means which in turn transfers the catalyst to the desired regeneration zone which will effect carbon removal, catalyst heating and catalyst reactivation.

The present drawing indicates three levels of support-vane means 9 as providing for the support and spacing of the central core member 6 within the housing 1; however, where desirable, there may be additional levels of support members and an additional number of supports or vanes 9 at each of the levels indicated. In other words, the members 9 can well serve as "straightening vanes" and provide a redistribution of the rising column of entrained catalyst particles to in turn provide uniformity of catalyst density throughout the column as it carries from the lower end of the riser to the upper end thereof. Typically, the vanes 9 will be positioned in a radial manner between the core member 6 and the interior wall of chamber 1; however, where deemed desirable, there may be other types of vanes or a different configuration for the vane in order to provide enhanced redistribution of the disperse phase column to, in turn, effect uniformity of catalyst distribution throughout the entire annular form cross-sectional area of the reaction zone.

Referring now to FIG. 2 of the drawing, there is indicated an elongated tubular housing 18, which is similar to that shown in FIG. 1, and is provided with an internal core member 19 which extends centrally along the longitudinal axis of the chamber so as to block-out the central cross-sectional area of the reaction zone and result in an annular-form disperse column of particles 20 throughout the length of the entire riser-reactor system.

In the present embodiment, the core member 19 is at least partially supported by and positioned within the center of the unit by means of support-vane members 21 at varying levels throughout the height of the unit; however, in this instance, the upper end of the core member 19 extends downwardly from the lower end of a centrifugal particle separating unit 22 so as to serve as an elongated dip-leg member permitting the recycle of particles interiorly within member 19 to a lower open end portion at 23. This lower open end 23 is shielded by a cup-like member 24 such that there is necessarily a 180° turn with respect to the flow of catalyst particles from such lower end of core member 19 and the resulting eduction of the particles into the rising annular-form column 20.

Also, in a manner similar to FIG. 1, there is indicated a feed stream entering the lower end of chamber 18 by way of conduit 25 in admixture with catalyst particles from conduit 26 such that there is an introduction of the dispersed phase of entrained particles by way of distributor means 27 at a zone below cup member 24 and the lower end portion of core member 19. The method of introducing the heated and reactivated particles into the system should not, however, be limited to the method shown and may be, for example, effected directly into the lower end of the housing 18 above distributor means 27 rather than through the down-pipe 26 into conduit 25.

At the upper end of the riser-reactor unit, there is indicated a frustra-conical section 28 and upper cap member 29 which, in turn, is shown supporting a centrifugal separator means 22 which will receive the entire resulting gaseous stream of product and entrained catalyst particles. The effluent from separator 22 will carry by way of transfer conduit 30 into additional separator means 31 whereby a substantially particle-free product stream can be carried overhead to suitable recovery equipment by way of line 32 while, at the same time, recovered particles from separator 31 will be transferred by way of line 33 to a catalyst regeneration zone 34. The latter is shown diagrammatically inasmuch as it is not intended to limit the reactivation-regeneration operation to any one type of system or to any type of apparatus arrangement. Actually, the regeneration portion 34 may comprise one or more contacting units, including: a catalyst stripping section, a carbon burn off section, additional stripping or reducing zones, etc. Diagrammatically, there is indicated the line or conduit 26 connecting between regeneration zone 34 and the feed inlet line 26 whereby reactivated and reheated catalyst particles may be returned to the riser-reactor zone for reuse therein.

As hereinbefore noted, in connection with certain process operations, as for example the dehydrogenation of propane to produce propylene, there may be utilized a relatively large quantity of subdivided catalyst in the reactor zone in order to have a high catalyst to oil ratio and, as a result, the catalyst reaching the upper end of the riser-reactor zone will not be particularly carbonized or deactivated. Thus, in order to provide an ideal arrangement for controlled recirculation of contacted catalyst in the unitary system, there may be the use of separator means 22 that will withdraw a regulated or controlled portion of the total catalyst in the dilute stream so that this desired portion of catalyst can be recirculated to the inlet end of the reactor zone through the core member 19. As a result, the latter is serving a dual function in that it serves to block-out the central area of the riser-reactor and enhance fluid flow by causing an annular-form disperse rising column of particles while, at the same time, such member can serve as a special elongated dip-leg to return at least a portion of catalyst in a controlled manner into the lower end of the riser-reactor, without having to carry catalyst outside of the unit with an accompanying loss in temperature. Actually, an internal dip-leg configuration retains the recirculated catalyst within the riser-reactor and has it flow downwardly in a heat exchange relationship with the rising column of catalyst. It should also be noted that one of the overall effects of the catalyst recycle through the core member is to provide an operation where a low quantity of catalyst is transferred to the catalyst regeneration system while at the same time having a large quantity of catalyst retained in the riser-reactor zone. There may be the need to supply a somewhat greater temperature to the regenerated catalyst being returned by way of conduit means 26 in order to supply the desired endothermic heat into the lower end of the riser-reactor 18 and maintain a desired average temperature throughout the height of the column.

As described in connection with FIG. 1, various levels of support members 21 may be utilized to serve as both supports and vanes to effect distribution of the rising disperse phase of particles in the reaction zone. However, where desirable, additional levels of support members 21 may be utilized to serve as both supports and vanes to effect distribution of the rising disperse phase of particles in the reaction zone. However, where desirable, additional levels of support members 21 may be utilized and a large quantity of vanes used at each of the varying levels.

Although not shown in the present drawing, it is to be pointed out that an open-ended core member, such as 19, might well be used without the upper separator means 22 in an arrangement where a small portion of the entrained catalyst can fall into an upper open end and descend in a gravity flow to the lower interior portion of the riser-reactor column to be subsequently educted and redistributed into the rising annular column of feed stream and entrained particles. However, the use of a particle collector-separator means, such as indicated at 22, is preferable for effecting the recirculation of a controlled quantity of catalyst. Actually, the separator means 22 and 31 are diagrammatic and two or more separator means in series or in parallel may be utilized in lieu of the arrangement diagrammatically indicated as part of FIG. 2. In any event, with respect to the separator means within the top portion of the riser-reactor column 18, it is necessary that the separated particles be returned by way of the core member 19 and not permitted to fall back to the top rising annular-form column of entrained particles so as to cause "back-mixing," "slugging," or other disruption of the rising flow of entrained particles.

Again, it is to be noted that different feed inlet means and varying forms of regenerated catalyst return to the lower end of the riser-reactor can be utilized and may be considered to be within the scope of the present invention.

I claim as my invention:

1. In the dilute phase fluidized catalytic contacting of a single feed stream with finely divided catalyst particles in an elongated riser-reactor column, the improved method of catalytically converting said feed stream comprising passing said stream upwardly co-currently with said catalyst particles in an annular-form column of rising particles to thereby preclude having a central zone of substantially feed stream flow without entrained catalyst particles, separating within said riser-reactor column a portion of the particles reaching the upper end portion of said riser-reactor column, passing said separated particles downwardly in a confined path through the center of said annular-feed stream containing entrained particles in said annular-forming column of rising particles, and discharging said separated particles into the lower portion of said riser-reactor column, whereby to provide a higher catalyst to feed ratio than would be obtained by a once-through flow in a riser-reactor column.

2. The method of claim 1 further characterized in that said separated particles which are passed downwardly in said confined path are caused to reverse direction of flow and are then educted into said annular-form column of rising particles.

3. The method of claim 2 wherein said step of said separation of said particles is performed by centrifugal separation.

4. The method of claim 3 wherein the remaining portion of said separated particles not fed downwardly in said confined path is fed to a catalyst regeneration zone and then recycled to said annular-form column of rising particles via said single feed stream.

5. The method of claim 1 further characterized in that said confined path for downward flow of said separated particles is of a size of the order of ⅓ to ½ of the outside diameter of the elongated riser-reactor column.

References Cited
UNITED STATES PATENTS

| | | | |
|---|---|---|---|
| 2,476,144 | 7/1949 | Gullette | 208—164 |
| 3,012,962 | 12/1961 | Dygert | 208—154 |
| 2,488,033 | 11/1949 | Johnson | 208—153 |
| 3,644,199 | 2/1972 | Evans et al. | 208—120 |

DELBERT E. GANTZ, Primary Examiner

S. L. BERGER, Assistant Examiner

U.S. Cl. X.R.

23—288 S; 208—161